Feb. 19, 1963 T. M. CORRY 3,078,389
ELECTROLUMINESCENT AND FLUORESCENT LIGHTING
Filed Nov. 21, 1960 3 Sheets-Sheet 1

WITNESSES

INVENTOR
Thomas M. Corry
BY
ATTORNEY

Feb. 19, 1963   T. M. CORRY   3,078,389
ELECTROLUMINESCENT AND FLUORESCENT LIGHTING
Filed Nov. 21. 1960   3 Sheets-Sheet 3

United States Patent Office 3,078,389
Patented Feb. 19, 1963

3,078,389
ELECTROLUMINESCENT AND FLUORESCENT LIGHTING
Thomas M. Corry, Monroeville, Pa., assignor to Westinghouse Electric Corporation, East Pittsburgh, Pa., a corporation of Pennsylvania
Filed Nov. 21, 1960, Ser. No. 70,629
8 Claims. (Cl. 315—185)

This invention relates to the use of electroluminescent panels in combination with fluorescent lamps in an alternating current lighting system. It is principally concerned with the use of electroluminescent panels in combination with fluorescent lamps so that the capacitive effect of the electroluminescent panels serves at least as part of the ballasting component for the fluorescent lamps.

This invention thus describes a method for combining fluorescent lamps and electroluminescent panels so that advantage can be taken of the highly capacitive reactive component present when the electroluminescent panel is excited. Since light is obtained from both the electroluminescent panel and the fluorescent lamp, greater lighting efficiencies and unusual lighting effects are accordingly produced.

In the past, it has been common to operate fluorescent lamps on 60 cycles per second power and the concepts of this invention are well adapted to this operation as will be described in more detail later. Recently, however, it has been found highly advantageous to operate fluorescent lamps on frequencies higher than this. Installations of high frequency lighting now in use include applications in plant life areas where light to stimulate growth is of prime importance, in university field houses, office buildings, and in many industrial areas. The success of these installations has served to further stimulate the interest in high frequency of most branches of the lighting industry and their many consumers.

High frequency lighting improvements in the ballast circuits for use with frequency converters has made it evident that improvements in size, weight, and cost of ballast components has reached the point of diminishing returns when operated on frequencies of 60 cycles per second. The ballast has been a necessary but unwanted appendage to the fluorescent lamp fixture inasmuch as it diverts power from the production of illumination. It has added to the cost and weight and otherwise has decreased the overall efficiency of fluorescent lighting. This trend toward high frequency lighting, however, has made it possible to reduce the size, cost and weight of the ballast and in addition has made possible the more efficient use of capacitors as a ballast. However, capacitor ballasts even in high frequency operation function as non-light producing power consuming elements which must be fabricated so as to be connectable to or form part of the luminaire.

It has been found possible to employ electroluminescent panels in combination with fluorescent lamps so as to incorporate the capacitive effect of these electroluminescent panels to reduce substantially the size of capacitors needed, or even in many cases to eliminate them altogether as components necessary to ballast the fluorescent lamps. With the electroluminescent panels serving as ballasting units, the capacitor can not only be a means for ballasting the fluorescent lamps but can also be a producer of light and thereby increase the overall light producing capability and efficiency of any given luminaire arrangement.

In addition the invention engenders unique, useful, and decorative lighting effects as a result of unusual combinations of fluorescent lamps and electroluminescent panels. In this regard it might also be noted that the term electroluminescent panel includes all form of electroluminescent lamps and cells which can take an almost infinite variety of shapes and configurations. This combining of electroluminescent panels and fluorescent lamps, however, is effective whether employed in high frequency or in low frequency alternating current operation.

One of the principal objects of the invention, therefore, is to provide for more efficient lighting systems by utilizing conventional ballast power losses to produce light in addition to that normally produced by the fluorescent lamps in the luminaire by employing the capacitive characteristics of electroluminescent panels to ballast the fluorescent lamps.

Another object of the invention is to provide for the fabrication of a relatively inexpensive and efficient light producing ballasting structure adapted for use in fluorescent lighting systems.

A further object of the invention is to provide for gerater flexibility and light output in fluorescent fixture design.

A still further object of the invention is to provide a luminaire wherein the fluorescent lamp and electroluminescent ballasting panel can be contained in one glass envelope and thus eliminate the need for a separate ballast unit when installing the luminaire.

Another object of the invention is to provide a luminaire wherein an electroluminescent panel is in a cup-shaped or sleeve configuration fitting over the ends of fluorescent lamps so as to eliminate the conventionally dark ends thereof.

In connection with the last two objects, it is thus possible to develop both fluorescent lamps, and luminaires generally, which are free of external ballast units and which can be plugged directly into simplified fixtures. Also with the ballast units removed from its usual position on the top side of the luminaire, lighting fixtures can be mounted directly against ceilings thereby reducing the normally required overhead space required for lighting.

Still another object of this invention is characterized by the fact that electroluminescent lamps exhibit low leading power factors and the fact that both electroluminescent panels and fluorescent lamps function with improved efficiency at higher frequencies. Previously it has been difficult to illuminate large areas with high frequency power without resorting to the use of costly power conversion and ballasting equipment. However, by combining both electroluminescent and fluorescent lighting in a high frequency lighting system it is possible to reduce and justify the added cost of frequency conversion, to reduce the cost of ballasting, and to utilize the best features of both forms of lighting.

Thus, one of the objects of the invention is using high frequency excitations for an electroluminescent panel in series with a fluorescent lamp so that there is provided a sufficient capacitive effect to permit adequate ballasting for excitation of the fluorescent lamp while simultaneously securing illuminative output from the electroluminescent panel.

Another object of the invention is the provision of unique and decorative structural arrangements of fluorescent and electroluminescent lamps, with the latter serving as ballasting for the fluorescent lamp or lamps.

A still further and more specific object of the invention is to incorporate electroluminescent panel ceiling, the panels being either solid or perforate, in combination with recessed troffers for fluorescent lamps so as to provide an illuminated ceiling of uniquely attractive characteristics.

Another object of the invention is to make the side panels and, in some applications, the end panels of fluorescent fixture housings of electroluminescent panels so as to eliminate all dark areas around the fixture as well as to provide means for ballasting the fluorescent lamps.

Another object of the invention is to incorporate a combination of electroluminescent panels and capacitors or inductances to ballast fluorescent lamps in a fixture whereby the capacitive effect of the electroluminescent panels substantially reduces or eliminates the requirement for additional, conventional capacitance means with this latter arrangement being particularly adapted to lower frequency alternating current operation.

These and other objects of the invention will become more apparent upon consideration of the following detailed description of illustrated embodiments thereof when taken in connection with the attached drawings, in which.

Although the invention is herein specifically described as embodied in the modifications as shown in FIGURES 1 to 8, it should be understood at the outset that the invention in its various aspects can be readily adapted to other embodiments than those exemplified herein and consequently, the following descriptive matter is intended as illustrative rather than limitative of this invention.

Figure 1:
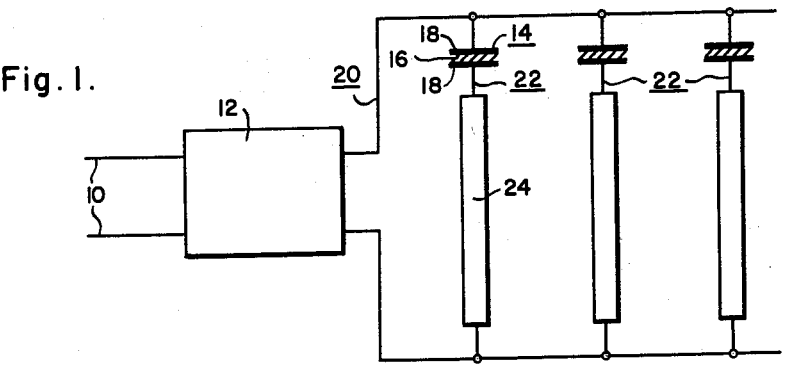
FIGURE 1 is a schematic circuit diagram showing one arrangement in accordance with the invention for connecting fluorescent lamps and electroluminescent panels in series to a source of supply potential.
Figure 2:
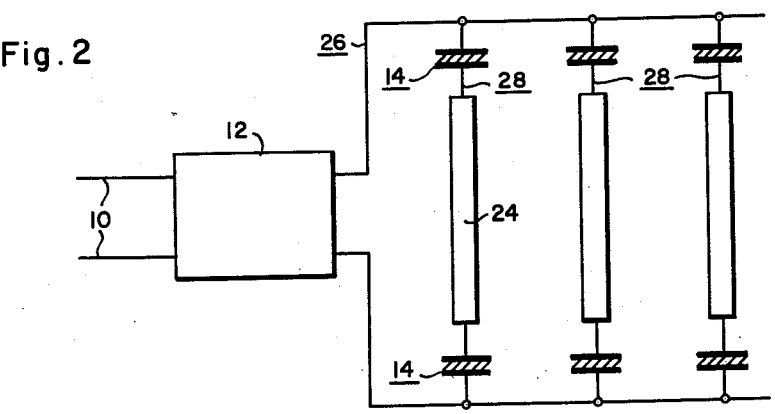
FIGURE 2 is a schematic circuit diagram of another application of the invention showing the circuit of the apparatus used to operate the lighting system wherein each fluorescent lamp is connected in series with electroluminescent panels on each side thereof.

The schematic circuit diagrams of FIGURES 1 and 2 illustrate a relatively low frequency alternating current source 10, such as a 60 cycle per second power source, which is passed through energizing circuitry 12 to attain a relatively higher frequency. The energizing circuitry 12 should include a frequency changer and can optionally include a transformer when desired. Such high frequency lighting systems generally utilize several common types of frequency changers as for example a Magnetic Frequency Multiplier, a Motor-Generator Set, or a Transistor Frequency Changer. Each of the above frequency changers possesses a different characteristic output voltage and current wave shape and the determination of which to use in any particular circuit depends on the results desired. An example of a particular inverter that could operate efficiently and effectively in such a circuit as shown in FIGS. 1 and 2 would be that disclosed in the application of J. F. Roesel, Jr. et al., Serial No. 834,306, filed August 17, 1959, entitled "Electrical System for Energizing Load Apparatus," and assigned to the same assignee as the present application.

However, it will presently be made apparent that the principles of this invention relating to the ballasting effect of electroluminescent panels can be used to advantage with any of the high frequency equipment mentioned above or with conventional alternating line potential.

When light is generated by the action of a fluctuating electric field on various solid materials by a number of different mechanisms it is given the terminology electroluminescence. In the examples of this invention, the electroluminescent cell 14 is constructed something like a sandwich in which a known phosphor 16, capable of emitting light in a dynamic electric field, is placed between a pair of conducting plates 18 or films or grids (not shown) one of which is at least light-transmitting. The phosphor 16 is usually disposed in a high dielectric binder. The materials suitable for the conductor plates, phosphor and dielectric binder are well-known. Light is emitted when an alternating or fluctuating voltage is impressed across the members 18. A more detailed illustration of a specific electroluminescent cell which can be used is given later.

Electrically, the electroluminescent cell 14 exhibits properties similar to those of a capacitor. Hence, it is feasible to employ electroluminescent cells in combination with fluorescent lamps so as to utilize the capacitive effect of these cells to ballast the fluorescent lamps as well as to add the radiations or illumination of the electroluminescent cell to that already emitted by the fluorescent lamps.

Specifically, there is shown in FIGURE 1 a schematic circuit diagram 20 wherein electroluminescent units 14 are formed as part of a lighting system, indicated generally at 22, which supports radiation elements or lamps 24. The elements 24 can be any discharge means which, when energized, produces radiations and operates with a negative volt-ampere characteristic, such as a fluorescent lamp for example. The high frequency obtained through an inverter or frequency changer in the energizing circuitry 12, which as mentioned previously converts the low frequency source 10 to a high frequency, serves to start and operate the lighting system which comprises the electroluminescent lamps or cells 14 connected in series with the fluorescent lamps 12. Each component group or luminaire 22 of these electroluminescent-fluorescent lamps can also be connected electrically in parallel with similar component groups 22 to increase the light output in a given lighting system. A transformer can be optionally used as an impedance in the energizing circuitry 12 where it is felt best not to rely on the ballasting effect of the electroluminescent cells 14 alone. The transformer can be any of the well known conventional transformers commonly used in fluorescent lamp circuitry. The transformer can similarly be employed in the circuitry of FIGS. 2 and 3 which are described below.

The schematic circuit diagram 26 shown in FIGURE 2 is substantially similar to that shown in FIGURE 1, with the exception that each component group or luminaire 28 comprises not just the combination of a single electroluminescent panel and a fluorescent lamp, but instead comprises a plurality of electroluminescent lamps or cells in combination with a single fluorescent lamp. In this particular case, an electroluminescent lamp 14 is located on each side of a single fluorescent lamp 24. In all other aspects, the circuitry of FIG. 2 is the same as and functions similar to that shown in FIGURE 1. The primary purpose then of showing the schematic circuit diagram 26 is to illustrate one of the many different possible combinations of components that may be contained in a single group or luminaire utilizing the concepts and principles of this invention. In the particular instance of FIG. 2, each pair of the electroluminescent lamps 14 serves as a capacitor for each fluorescent lamp 24, where, in certain applications, a single electroluminescent lamp 14 is not sufficient to provide the full capacitive ballasting effect required for the fluorescent lamp. A plurality of these electroluminescent lamps 14, at certain frequencies, are sufficient to eliminate the necessity of having supplemental conventional capacitors in the circuit. Of course, it is also contemplated that the area of a given electroluminescent lamp 14 can be increased so that one rather large electroluminescent lamp can be used to give the same effect as two or more smaller electroluminescent lamps.

Figure 3:
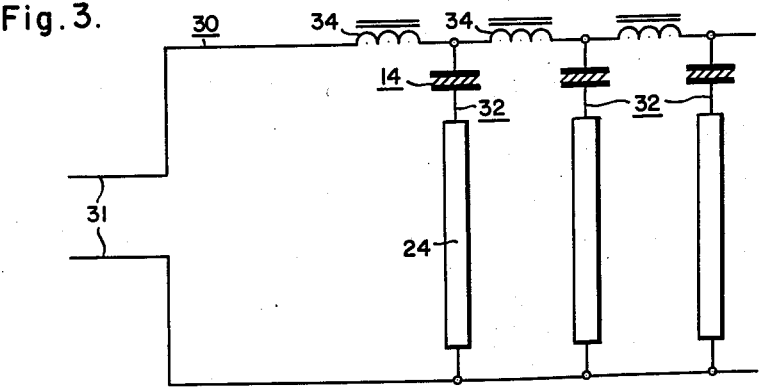
FIGURE 3 is a schematic circuit diagram of still another application of the invention showing the circuit of the apparatus used to operate the lighting system wherein inductances are used in combination with electroluminescent panels to ballast fluorescent lamps.

In this same connection, there is illustrated in FIGURE 3 a schematic circuit diagram 30 for illustrating a low frequency lighting system with the low frequency source commonly 60 cycles per second, being indicated at 31. As stated previously, the low frequency 31 can optionally provide a source that has first passed through a transformer to provide sufficient voltage to start and, once started, to continuously operate the system illustrated when it is felt this may be advantageous in a given situation. Normally in such an organization A.-C. capacitors are used in conventional ballast systems as power factor correctors. Depending upon the particular ballasting or starting circuit used, the lamps 14 can be connected in either series or parallel relation with the fluorescent lamps 24. Electroluminescent lamps or cells 14 can be used to provide at least a portion of the capacitive effects in many ballast designs. Previously, low frequency ballasting through capacitance alone has been impractical because of the large size of conventional capacitors necessary to be appended to the luminaire fixture. By employing such electroluminescent lamps as a part of the luminaire 32 in combination with a fluorescent lamp 24, the size of conventional impedance, for example the inductance 34 necessary for ballasting each fluorescent lamp can be substantially reduced or in many instances completely eliminated. Again, in the illustration of FIGURE 3 a plurality of component groups or luminaires 32 may be connected in parallel with an inductance located between each, if necessary, to multiply the illuminating effect of the entire sysetm 30. Numerous other combinations of component group arrangements are likewise possible, the system 30 merely being exemplary of the many possibilities.

To illustrate the invention even more clearly a somewhat more detailed example may be helpful. In this example the electroluminescent cell serves as the complete ballasting component for a 40 watt fluorescent lamp connected in series with the cell and operated at a frequency of 1,500 cycles per second.

The particular electroluminescent cell used comprises a layer of finely divided phosphor embedded in dielectric material, with this phosphor-dielectric layer sandwiched between two electrodes, at least one of which is light transmitting. The thickness of the phosphor dielectric layer is two mils. The phosphor is copper-activated zinc sulfide having an average particle diameter of about twelve microns. One part by weight of the phosphor is embedded in two parts by weight of a light-transmitting dielectric material, such as polyvinyl chloride. When this cell is operated at a relatively high frequency, such as 1,500 cycles per second, the dielectric loss is relatively small. The capacitive reactance for this cell is in the order of 100 micro-microfarads per square centimeter of cell area. Thus, it can readily be calculated that it takes 10.7 square feet of this cell to obtain one microfared of capacitive reactance.

Since it takes about 0.444 microfarad to operate a 40 watt rapid start type fluorescent lamp at 1,500 cycles per second, approximately 4.8 square feet of electroluminescent cell is all that is needed to ballast the lamp. By the same method approximately 9.5 square feet of this electroluminescent cell can ballast two 40 watt rapid start fluorescent lamps in series sequence operating at 1,500 cycles per second. However, at lower frequencies additional cell area obviously is required. For example, it requires approximately 237 square feet of cell area to ballast a pair of similar 40 watt fluorescent lamps operating at 60 cycles per second. This contrast between high and low frequency operation clearly illustrates the peculiar compatibility of electroluminescent ballasting with high frequency lighting. Of course, electroluminescent cells can vary in construction and if a very thin film of phopshor, having a thickness in the order of 5 microns, is used instead of that indicated above the capacitive reactance of the cell will be increased considerably. Thus, even at 60 cycle operation, the ceiling area of a given room, if the area is substantially covered by electroluminescent panels to effect a luminous ceiling, is adequate for ballasting the fluorescent lamps employed in the room.

The remaining figures of the drawings, namely FIGURES 4 to 8, are illustrations of specific embodiments of the invention incorporating schematic circuits such as illustrated in FIGURES 1 to 3, for example.

Figure 4:
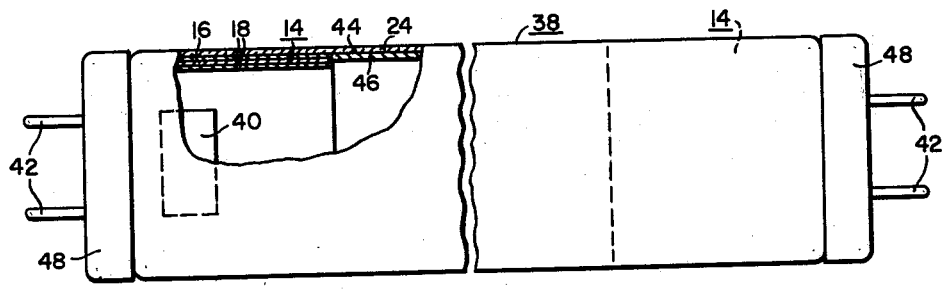
FIGURE 4 is an illustration of a fluorescent lamp with a portion broken away showing that both the electroluminescent lamp and the fluorescent lamp can be contained in a single glass envelope.

FIGURE 4 illustrates a single lamp design which can be fabricated so that both the fluorescent lamp or tube 24 and one or more electroluminescent lamps 14 are enclosed in a single envelope, so as to form a component group 38 presenting the appearance of a single lamp. Each of these envelopes 36 are made of a light-transmitting material such as glass. In this particular embodiment a fluorescent lamp 24 is connected in series with an electroluminescent lamp 14 at each end thereof. The electroluminescent lamps 14 are tubular in shape and of a diameter slightly smaller than that of the fluorescent lamp 24 so as to fit within the envelope at each end of the fluorescent lamp and thereby present a unitary structure in a single glass envelope. The filament 40 and the connectors 42 for the fluorescent lamp fixture may be located within the heart of the electroluminescent lamp 14 and still work quite effectively. The electrical connections (not shown) between the electroluminescent lamps 14 and the fluorescent lamp 24 can be series, series-parallel, or parallel depending upon the particular application of the system or the ballasting circuit employed. It might further be noted that there is illustrated in the broken away portion of FIGURE 4 the normally external glass surface 44 of the fluorescent lamp 24 and the interior phosphoric surface 46 thereof. Also shown are the component layers 16 and 18 of the electroluminescent lamps 14, as described earlier in the specification and which fit within the glass surface 44 of the fluorescent lamp 24. The glass envelope thus actually comprises the glass surface 44 of the fluorescent lamp only with the phosphoric surface 46 thereon removed at the ends where the electroluminescent lamps 14 are inserted. However, as an alternative both a fluorescent lamp and electroluminescent lamp could be inserted in a separate glass envelope (not shown) but this would mean a double thickness of glass which would reduce the lamp efficiency somewhat.

Figure 5:
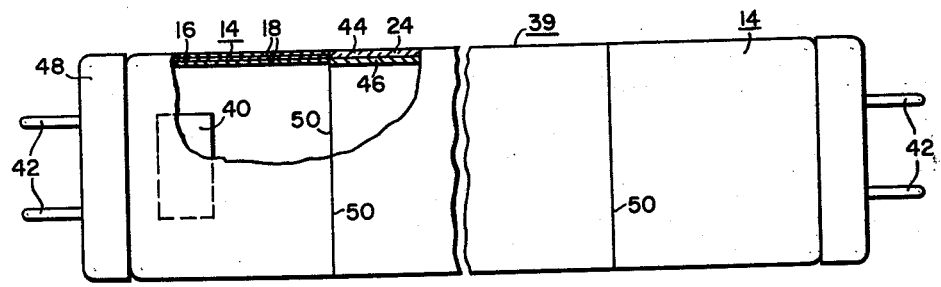
FIGURE 5 is an illustration of a fluorescent lamp combined with tubular electroluminescent lamps with the broken away section illustrating that an electroluminescent lamp is attached to each end of the fluorescent lamp.

FIGURE 5 shows a single lamp design which is basically similar to that shown in FIGURE 4 only minus the glass envelope. In this arrangement the fluorescent lamp or tube 24 has at each of its ends an electroluminescent lamp 14, tubular in shape and having a diameter conforming to that of the fluorescent lamp and joined thereto along the line 50 by a glass cement or the like so that in effect there is presented a single lamp 39, with the outer cap 48 and prong 42 and filament 40 of the lamp being located within the tubular electroluminescent lamp 14. However, in this embodiment the joining lines 50, are more readily apparent on the outside of the lamp 39. The component parts 16 and 18 of the electroluminescent lamps 14, and 44 and 46 of the fluorescent lamps 24 are illustrated in the broken away portion of FIGURE 5. This can readily be compared with the similar portion of FIGURE 4, the difference being that in FIGURE 5 the glass surface 44 of FIGURE 4 is not present in the areas occupied by the electroluminescent lamps 14.

Another embodiment of this invention utilizes a cup-shaped tubular or sleeve-like electroluminescent lamp 14 which serves as a cover fitting over the ends of a standard fluorescent lamp or tube 24, as shown in FIG- URE 6. In this illustration the lower conducting plate 18 is bent around so as to fit over the edge of the cap 48, the flange portion of the plate 18 serving as a means for limiting the movement of the sleeve portion of the cover on the fluorescent lamp 24. The flange portion of the plate 18 can be open at the middle thereof to define an aperture 36 for the prongs 42 to pass through. The electroluminescent lamp 14 is again, as in FIGURES 4 and 5, electrically connected to the fluorescent lamp 24 with the connections (not shown) being similar to those described above, so as to ballast the fluorescent lamp.

Figure 6:
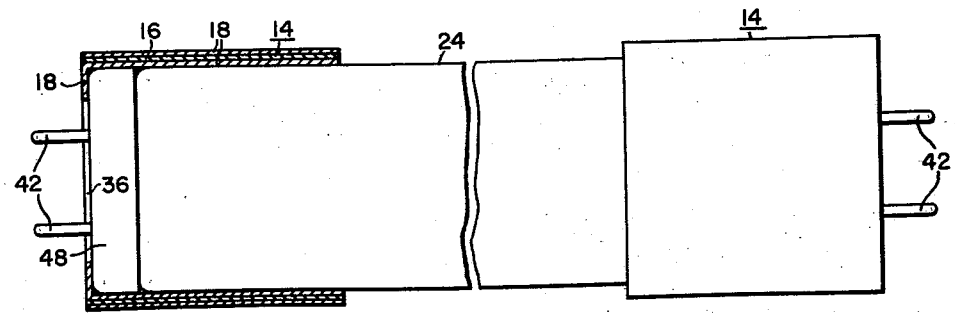
FIGURE 6 is an illustration of a fluorescent tube with electroluminescent covers placed over the ends thereof with one of the covers being in section.

With respect to each of the modifications of FIGURES 4, 5 and 6, it will be noted that the electroluminescent lamp or cell 14 extends over a relatively short area at the ends of a fluorescent lamp 24. These end portions are usually quite dark compared to the rest of the fluorescent lamp due to the filaments being located at these ends. The electroluminescent lamp 14 thus serves the dual purpose of eliminating the dark ends of the fluorescent lamps 24 and providing a capacitive effect to ballast the fluorescent lamps. If desired, electroluminescent cells, such as the covers 14 of FIGURE 6, can have attached thereto means (not shown) to support the fluorescent lamp 24, this means being in addition to the support the prongs 42 can give. The capacitive effect of the electroluminescent lamp 14 is sufficient in many instances to completely ballast the fluorescent lamps so that they can be free of an external conventional ballast and thus can be plugged directly into simplified fixtures. If this be the case, the need for a cumbersome ballast in luminaire fixtures and the provision of channel means to contain these ballasts would be entirely eliminated. The efficiencies gained both in simplicity and cost would, therefore, be substantial.

Figure 7:
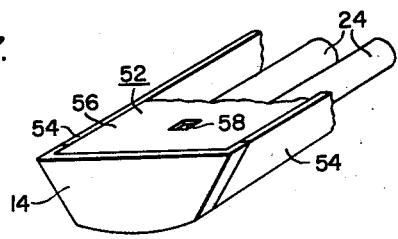
FIGURE 7 is a partial isometrical view of a lighting fixture housing wherein the end cover is an electroluminescent panel.

As illustrated in FIGURE 7, another embodiment of the applicant's invention comprises lighting fixture 52 for a pair of fluorescent lamps 24. The lighting fixture 52 is so designed that it has an electroluminescent end cover or cell 14 which serves not only to eliminate the normally dark end of the lighting fixture 52 but also serves as a capacitor to ballast the fluorescent lamps 24. This lamp fixture 52 comprises the normally transparent side panels 54 secured to the housing 56 by some conventional means, the latter having knock-outs 58 for mounting the fixture either flush against the ceiling or to stems suspending down from the ceiling (not shown). Where the end cover 14, or a pair of such end covers, provides the full capacitive effect necessary to ballast the fluorescent lamps 24, the otherwise necessary ballast channel can be eliminated from the housing 56, as illustrated in FIGURE 7, so as to present a lighting fixture that can be mounted flush against a ceiling if desired.

If desired, the lamp arrangements of FIGURES 4 to 6 could be substituted for the fluorescent lamps 24 in the lighting fixture 52 of FIGURE 7, thus combining the advantages of different embodiments of the invention in a single lighting fixture. Such an arrangement also substantially reduces the normally required overhead space necessary for the lighting fixtures. This in combination with the fact that the dark ends of the fluorescent lamps are illuminated, due to the modifications of FIGURES 4 to 6, and the dark ends of the lighting fixtures are substantially eliminated, in the modification of FIGURE 7 results in a luminaire having a more uniform light output and pleasing appearance.

Figure 8:
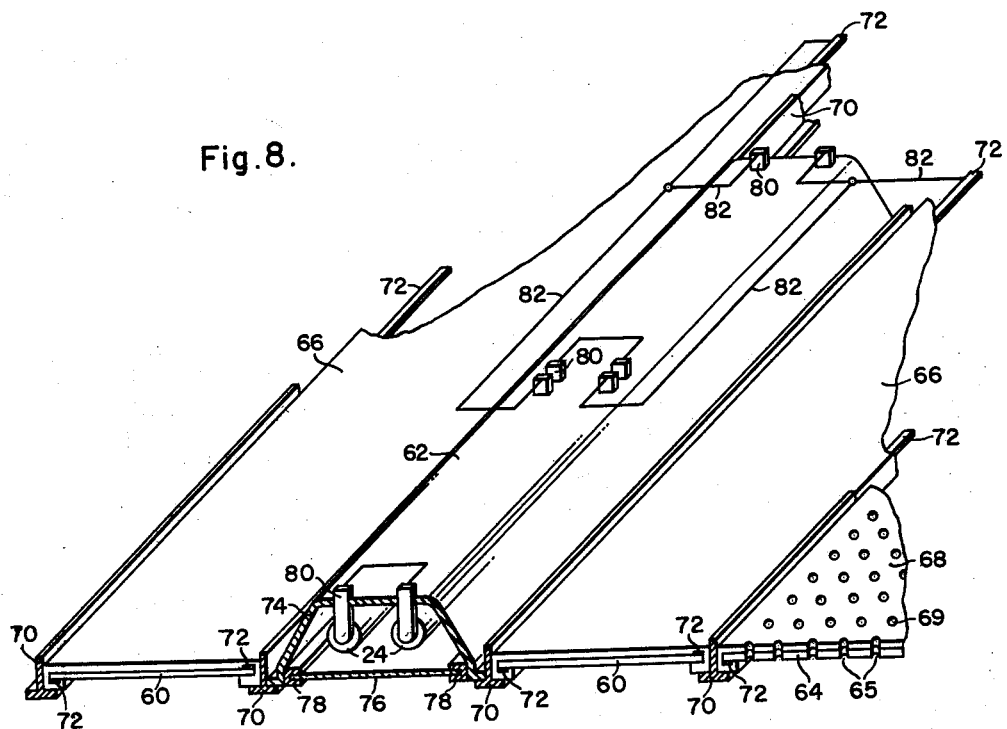
FIGURE 8 is a partial isometrical view of a luminous ceiling comprising electroluminescent panels in combination with recessed troffers, with portions of both being broken away.

A composite ceiling arrangement embodying the concepts of the invention illustrated in FIGURE 8 wherein the ceiling is formed from electroluminescent panels 60 in combination with recessed troffers 62. The electroluminescent panels can be solid as illustrated at 60 or can be perforated, as illustrated at 64, or a combination of such panels can be employed. The perforated panels 64 have the advantage of being adapted for use with a ceiling plenum chamber for air conditioning and also provide for sound deadening effects. However, when perforating electroluminescent panels 68 it is important that each perforation 65 is coated, otherwise moisture in the individual perforations will break down the phosphor layer. For this reason, it is relatively less expensive to use solid electroluminescent panels 60, in many instances. Each electroluminescent panel 60 or 64 is supported on inverted T-shaped structural beams 70 by means of a frame 66 which rests on the shoulders formed by the head portions of the perforated ceiling as desired; the frame 68 has apertures 69 registrable with the perforations 65 in the electroluminescent panel 64. Bus bars 72 of each frame 66 and 68 serve to electrically connect the electroluminescent panels into the circuit.

The recessed troffer 62 includes a housing 74 which receives a transparent bottom closure 76 of the fixture by means of channel members 78 connected thereto. Suspended from the top of the housing 74 through apertures therein, are lampholders 80 to which are directly connected the fluorescent lamps 24. Electric connectors 82 then serve to connect the lampholder 80 and fluorescent lamps 24 in series with each of the electroluminescent panels 66 and 68 by means of the bus bar 72 so that not only do the electroluminescent panels serve to illuminate the ceiling but also serve to provide the capacitive ballasting effect necessary for the fluorescent lamps 24.

In view of the foregoing, it will be apparent that the uniquely different and highly efficient forms of lighting systems and lamps are disclosed herein. It is desired that this invention not be limited to the particular embodiments specifically described herein, but will be limited only within the spirit and scope of the claims. The embodiments disclosed herein are merely illustrative, but not limiting, as to other forms which this invention can take and of various other ways which the invention can be used. Accordingly, it is desired that the invention be interpreted broadly and that it be limited only in accordance with the prior art.

Accordingly, what is claimed as new is:

1. An illumination source comprising a light-transmitting outer envelope, a portion of said envelope forming a fluorescent lamp, an electroluminescent cell having the same cross-sectional configuration as said lamp and fitted into at least one end of said envelope, said envelope presenting open opposite ends, a cap containing filaments and contacts located at each end of said envelope so as to enclose said source and secure said filaments and said contact in said source, said lamp and said cell being electrically connected so that said cell can serve as at least a part of a ballast for said lamp when the source is operating, and means for electrically connecting said lamp and said cell to a source of fluctuating electric potential sufficient to start and operate said source, said cell totally concealing said filaments and contacts within said source.

2. An illumination source comprising a fluorescent lamp, an electroluminescent cell connected to said lamp, said lamp and said cell having substantially the same cross-sectional configuration, said lamp and said cell presenting open opposite ends, cap members, filaments and contacts supported by said cap members, said cap members being secured to said source so as to enclose the open ends thereof and secure said filaments and said contacts in the ends of said source, said lamp and said cell being electrically connected to one another and to said filaments and contacts, said cell at least partially ballasting said tube when the lamp is operating, said cell being positioned to conceal said filaments and contacts at one end of said source, and means for electrically connecting said lamp and said cell to a source of fluctuating electric potential sufficient to start and operate said source.

3. A lighting unit comprising an elongated fluorescent lamp having filaments and contacts secured to cap members, said cap members affixed to opposite ends of said lamp, electroluminescent end covers fitting over the ends of said lamp, said covers having a sleeve portion and a flange portion, said flange portion serving to locate said covers on said fluorescent lamp, said lamp and said covers being electrically connected, said covers at least partially ballasting said lamp when the lamp is operating, and said covers concealing said cap members and said filaments and contacts while illuminating the normally dark areas at the ends of said lamp.

4. A lighting unit comprising an elongated fluorescent lamp having cap members affixed to opposite ends thereof, contacts and filaments secured to said cap members and located within said lamp, electroluminescent end covers fitting over the ends of said lamp, said covers having a sleeve portion and a flange portion, said flange portion serving to locate said covers on said fluorescent lamp, said flange portion forming an aperture centrally thereof to permit prongs on said lamp to pass therethrough, and said covers concealing said cap members and said filaments and contacts while illuminating the normally dark areas at the ends of said lamp.

5. An electroluminescent end cover adapted to fit over the end of a fluorescent lamp comprising, a sleeve portion, a flange portion, said flange portion comprising at least one of the components comprising said electroluminescent end cover, said sleeve portion having substantially the same cross-sectional configuration as said fluorescent lamp, said cover being adapted to be placed over said end of said fluorescent lamp to illuminate the normally dark area at said end.

6. A lighting fixture comprising a housing, fluorescent lamps secured in said housing, end plates secured to said housing, said end plates each being formed substantially from an electroluminescent cell and being electrically connected to said fluorescent lamps so that said end plates serve as at least a part of ballast for said lamps, said end plates additionally serving to illuminate the normally dark ends of said fixture when said fixture is operational.

7. An illuminated ceiling structure comprising electroluminescent panels and spaced fluorescent lighting fixtures having bottom openings, fluorescent lamps contained in said fixtures, said panels being mounted adjacent said bottom openings in the same plane therewith, said bottom openings and said panels forming a continuous illuminated ceiling, means for electrically connecting said panels to the lamps of said fixtures so that said panels at least partially ballasting said lamps as well as illuminate the ceiling areas between said fixtures.

8. An illuminated ceiling structure comprising electroluminescent perforated panels and recessed fluorescent lighting fixtures having bottom openings, fluorescent lamps contained in said fixtures, means for mounting said perforated panels adjacent said bottom openings in the same plane therewith, said bottom openings and said perforated panels forming a continuous illuminated ceiling, connector means for electrically connecting said perforated panels to said fixtures, said perforated panels at least partially ballasting said tubes as well as illuminating the ceiling areas between said fixtures and providing ventilation access.

References Cited in the file of this patent

FOREIGN PATENTS

| | | |
|---|---|---|
| 1,095,405 | France | Dec. 22, 1954 |
| 756,932 | Great Britain | Sept. 12, 1956 |